United States Patent [19]
Baas et al.

[11] Patent Number: 5,235,578
[45] Date of Patent: Aug. 10, 1993

[54] METHOD FOR REDUCING ACCESS TIME IN A CD-PLAYER WITH A MEMORY BY STORING COMPRESSED INDEX DATA

[75] Inventors: Dieter Baas, Kehl; Hans-Robert Kühn, St. Georgen, both of Fed. Rep. of Germany

[73] Assignee: Deutsche Thomson-Brandt GmbH, Schwenningen, Fed. Rep. of Germany

[21] Appl. No.: 771,881

[22] Filed: Oct. 7, 1991

Related U.S. Application Data

[63] Continuation of Ser. No. 249,285, Sep. 26, 1988, abandoned.

[30] Foreign Application Priority Data

Sep. 30, 1987 [DE] Fed. Rep. of Germany ....... 3732946

[51] Int. Cl.$^5$ .............................................. G11B 17/22
[52] U.S. Cl. ........................................ 369/33; 369/30; 369/32; 369/47; 369/48; 360/49
[58] Field of Search .................... 369/30, 32, 33, 47, 369/48, 50; 360/49

[56] References Cited

U.S. PATENT DOCUMENTS

| | | | |
|---|---|---|---|
| 4,456,933 | 6/1984 | Schneider et al. | 360/49 |
| 4,531,163 | 7/1985 | Maerkl et al. | 360/49 |
| 4,618,950 | 10/1986 | Abè et al. | 369/33 X |
| 4,716,558 | 12/1987 | Katayama et al. | 369/33 |
| 4,862,439 | 8/1989 | Ando et al. | 369/30 |

FOREIGN PATENT DOCUMENTS

| | | |
|---|---|---|
| 2939912A1 | 10/1979 | Fed. Rep. of Germany . |
| 0186178 | 10/1984 | Japan ................................. 369/30 |

OTHER PUBLICATIONS

A Funkschau Article (Funkschau 15/1986, pp. 26–28) entitled "Zusammenstellen eines CD-Programms" (translation attached).
Miller et al., *C Programming Language: An Applied Perspective*, copyright 1987 by John Wiley & Sons, Inc. pp. 62–70.
Reynolds, *Program Design and Data Structures in Pascal.* copyright 1986 by Wadsworth, Inc. pp. 212–218.
Bacon, *The Motorola MC68000: An Introduction to Processor, Memory, and Interfacing.* copyright 1986 by Prentice-Hall International (U.K.) Ltd. pp. 77–84, 92.

*Primary Examiner*—Benjamin R. Fuller
*Assistant Examiner*—R. Gibson
*Attorney, Agent, or Firm*—Joseph S. Tripoli; Peter M. Emanuel; Thomas F. Lenihan

[57] ABSTRACT

In CD-players with a memory having A storage positions for the storage of titles recorded on a CD-record it can happen, that more titles C are on the CD-record than storage positions A provided therefore in the CD-record. In order to use the storage space better in these cases and to keep the access times to the single titles low, the difference of the start times of each two consecutive titles are stored, instead of storing the start times of the individual titles. The more titles that are recorded on a inserted CD-record, the better the storage space is used, and the more the access times are reduced.

4 Claims, 1 Drawing Sheet

METHOD FOR REDUCING ACCESS TIME IN A CD-PLAYER WITH A MEMORY BY STORING COMPRESSED INDEX DATA

This application is a continuation of application U.S. Ser. No. 07/249,285 filed on Sep. 26, 1988, now abandoned.

FIELD OF THE INVENTION

The invention is related to the field of compact disc players (CD-players) with a memory having storage positions for storing the index of an inserted CD-record.

BACKGROUND OF THE INVENTION

A description of which data are stored on a CD-record and how the same are processed, is set forth in the publication "Zusammenstellen eines CD-Programms" (composition of a CD-program) in Funkschau No. 15, Jul. 18, 1986 on the pages 26 to 28.

Every CD-record contains an index, in which data are stored, which give a information about the number of program blocks, the start times of the latter, and the total playing time of the record. The individual program blocks normally contain pieces of music, but may also contain, for example, spoken text or various sound effects for the setting to music (or noises) of films and photographic slides. Up to 99 program blocks can be stored on a CD-record, but typically only 10 to 20 varying pieces of music are stored on a CD-record.

The index of a CD-record has the data representation shown in the figure. In the first block A0 is the title of the first piece of music, in the second block A1 the title of the last piece of music and in the third block A2 is written the total playing time of the CD-record. In the following blocks D1 to Dn are the starting times of the separate n pieces of music, which are recorded on the CD-record. The blocks A0, A1, A2, and D1 to Dn are combined to one group G1, in which the index of the CD-record is completely stored.

The total storage space provided on a CD-record for the index is completely occupied with several of the groups, for example, G2 and Gm, directly following each other, so that the data of the index of the CD-record are stored with multiple redundancy.

During playback, the starting time data D1 to Dn, in which as many as three pieces of music make up the largest part of the data stored in the index, serves to calculate the starting times of the separate pieces of music.

After insertion of a CD-record into the CD-player the separate titles of the index are read from the CD-record and stored in the memory of the CD-player. Usually the available storage space is sufficient for all titles. But there also exist CD-records with more titles than can be accommodated by the space in the memory of the CD-player. If for instance the CD-player can store ten titles, but on the inserted CD-record there are twenty titles recorded, the times of access to the unstored titles are raised. That is, because the first ten titles are stored in the memory of the CD-player, the access time to these titles is in fact small, but for the unstored remaining ten titles, the access time would be disproportionate great.

SUMMARY OF THE INVENTION

It is therefore an object of the invention, to improve the use of the available storage space of a CD-player for the storage of the titles recorded on a CD-record.

The invention solves this object in that, when more titles C are in the index of the CD-record than there are storage positions A existing in the CD-player, at least some of the differences of the start times of each two consecutive titles are stored instead of storing the start time of the single titles.

BRIEF DESCRIPTION OF THE DRAWING

FIG. 2 is a flowchart showing the method of the subject invention.

FIG. 3a illustrates, according to the prior art, the arrangement of start-time data in the table of contents of a CD-player.

FIG. 3b illustrates the arrangement of start-time data in the table of contents of the subject invention.

DETAILED DESCRIPTION OF THE EMBODIMENT

Figure 1:
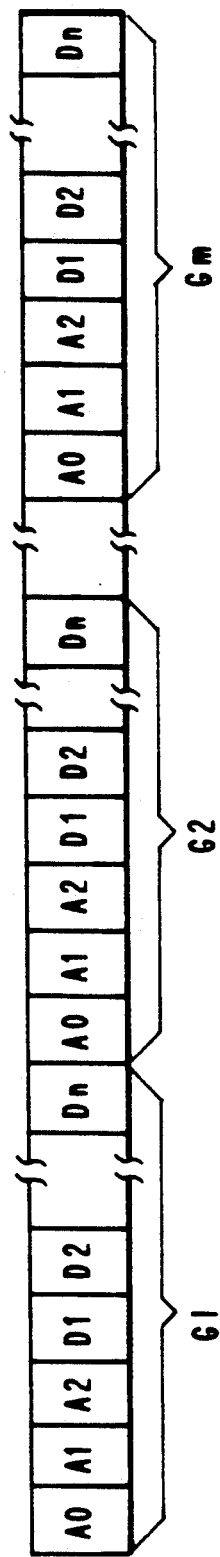
FIG. 1 illustrates the arrangement of the data in the index of a CD-record, as known from the prior art.

The invention will be explained using a number example. If on a CD-record with a total play time of 60 minutes and 20 seconds, 20 titles are recorded each having a play time of three minutes and one second (i.e. 181 seconds) a realistic value for popular music, about 1.4 times more storage space is needed for storing all 19 start times (e.g. 181 seconds, 362 seconds . . . 3439 seconds) than when the difference between adjacent start times (i.e. 181) is stored 19 times. The more titles that are stored on a CD-record, the better the results that will be achieved by using the invention. If, for example, 99 titles are recorded on a CD-record each having a 36 second duration, the storage space required will be reduced by a factor of about 2.3 in accordance with the invention.

Because the storage space is used better, the access times are reduced. That is, the problem of greatly differing access times is eliminated by storing all of the start time differences in the CD-player. Thus, the invention solves the problem which existed previously that only the few titles (which were stored in the memory of the CD-player) were found very quickly while, in contrast, the unstored titles were found after a relative long time.

The method of the subject invention, shown in FIG. 2, is entered at step 210 wherein data relating to a start-time is read from the index of the CD-Record. At step 220, a check is made to see if this is the first entry of the index. If so, the start-time as read from the index is stored (step 240). If not, the difference between the current starting-time and the last starting-time is computed (step 230) and the difference is stored (step 240). The method of the prior art comprises steps 210 and 240. Steps 220 and 230 are added in the subject invention, as indicated by the dotted box around those steps. The memory contents of a table of contents according to the prior art is contrasted against the memory contents of a table of contents of according to the subject invention in FIGS. 3a and 3b, respectively.

What is claimed is:

1. A method for reducing access time in a CD-player by storing elements of an index including a first predetermined number of titles and start times of programs of a CD-record in a memory of said CD-player having a second predetermined number of storage positions, comprising the steps of:

reading said titles from said index of CD-record;

determining that said first predetermined number of titles in said index exceeds said second predetermined number of storage locations of said memory;

reading any two consecutive titles from said index on said CD-record;

computing a difference of said start times of said two consecutive titles;

storing said difference of said start times of said two consecutive titles in one said storage locations if said first predetermined number of titles of said index of said CD-record exceeds said second predetermined number of said storage locations available in said CD-player; and accessing one of said programs of said CD-record in accordance with said stored differences of said start times of said consecutive titles.

2. The method of claim 1, wherein said index has a first title having a first start time and said start time of said first title is stored in one of said storage locations, and at each of the following storage locations said difference of said start times of two consecutive titles are stored.

3. A method for reducing access time in a CD-player by storing elements of an index including a first predetermined number of titles and absolute start times of programs of a CD-record in a memory of said CD-player having a second predetermined number of storage positions, comprising the steps of:

reading said titles from said index of said CD-record;

determining that said first predetermined number of titles in said index exceeds said second predetermined number of storage locations of said memory;

reading any two consecutive titles from said index on said CD-record;

computing a difference of said absolute start time of said two consecutive titles, said differences occupying less memory than said absolute start times;

storing said difference of the start times of two consecutive titles in one of said storage locations of said CD-player; and accessing one of said programs of said CD-record in accordance with said stored differences of said start times of said consecutive titles.

4. The method of claim 3, wherein said index has a first title having a first start time and said index has following titles and said start time of said first title of said index is stored in one of said storage locations, and when each of the following titles is read a difference of the start time of the newly-read title and the start time of the immediately preceding title is computed and stored.

* * * * *